United States Patent [19]

Grandmenil

[11] 4,417,652

[45] Nov. 29, 1983

[54] SCRAPER ARM

[76] Inventor: Gaston Grandmenil, 61 Rue de la Liberation, Le Mans, Sarthe, France

[21] Appl. No.: 136,106

[22] Filed: May 12, 1980

[30] Foreign Application Priority Data

Mar. 29, 1979 [FR] France .................. 79 08577

[51] Int. Cl.³ ............................ B65G 65/06
[52] U.S. Cl. .................. 198/511; 198/519; 414/133
[58] Field of Search ............ 414/133, 293; 198/510, 198/511, 519; 37/192 A

[56] References Cited

U.S. PATENT DOCUMENTS 4,284,369 8/1981 Gosponer et al. ............ 198/511 X

FOREIGN PATENT DOCUMENTS 2521715 11/1975 Fed. Rep. of Germany ...... 414/133
1490070 6/1967 France .................. 414/133

*Primary Examiner*—E. R. Kazenske
*Assistant Examiner*—Douglas D. Watts
*Attorney, Agent, or Firm*—Remy J. VanOphem

[57] ABSTRACT

A scraper arm apparatus for use especially with concrete mixers, including an endless chain provided at spaced apart intervals with scraper members and movable in a vertical plane about a support member, which is fixed to the opening of a hopper which receives aggregate from a pile on the ground level. The upper end of the support member is movable vertically with respect to the fixed hopper.

6 Claims, 6 Drawing Figures

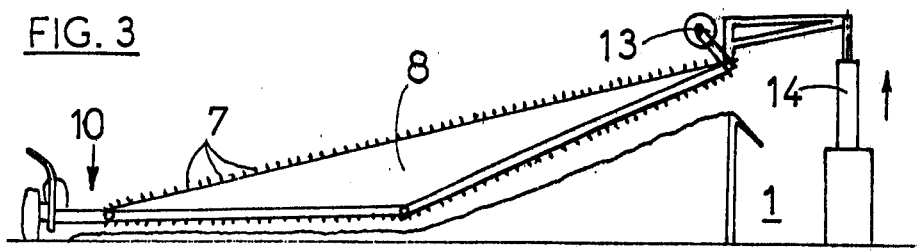
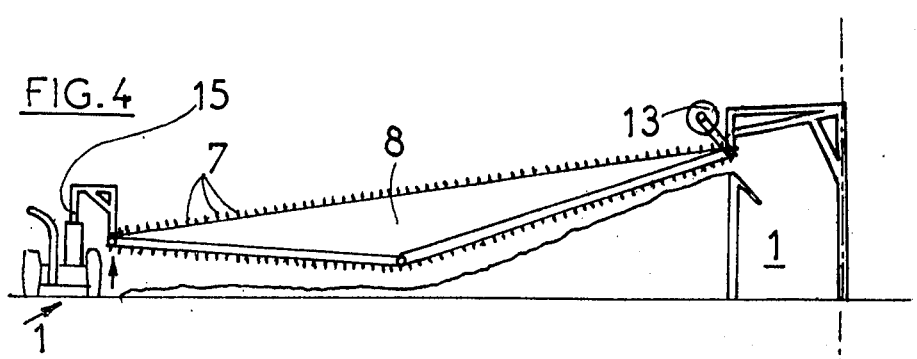
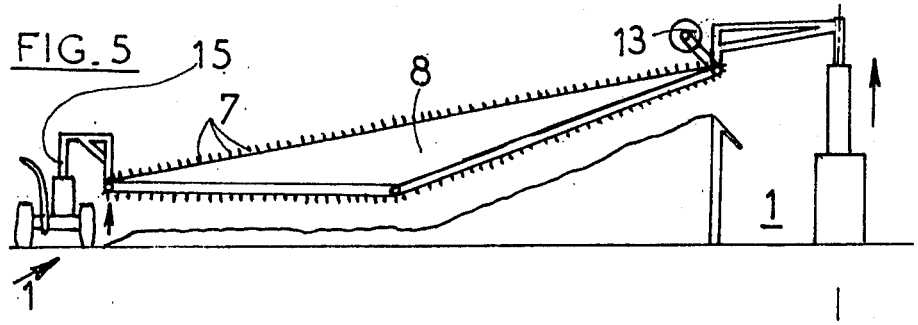
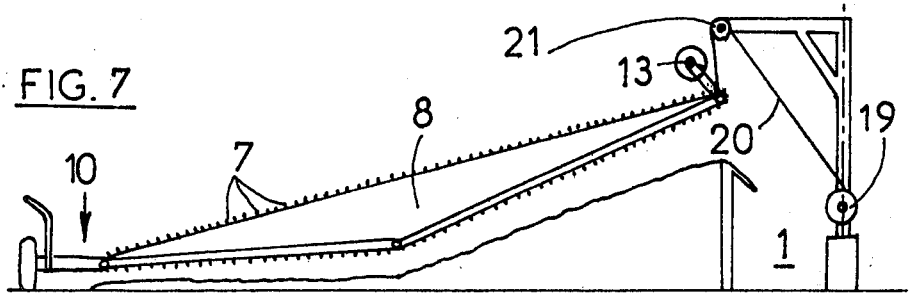
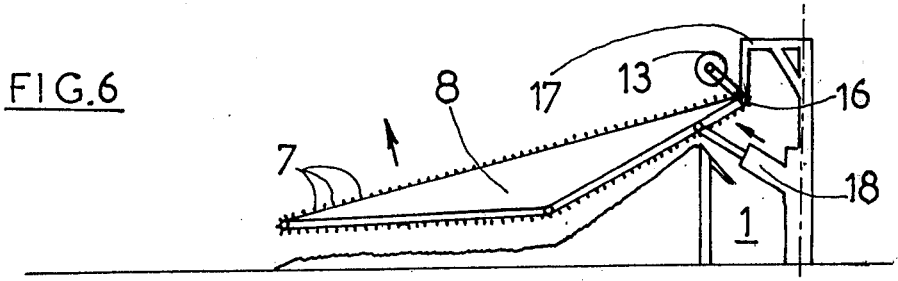

SCRAPER ARM

FIELD OF THE INVENTION

The present invention relates to a scraper arm for use especially but not exclusively with concrete mixers.

The invention also relates to all forms of scraper arms or bucket-chains or other apparatus provided with an endless chain carrying members which scrape the free surface of a pile of aggregate or other loose products in order to transport this aggregate to a hopper or any other container.

BACKGROUND OF THE INVENTION

A concrete mixing station may include several scraper arms which supply the same central hopper with aggregates of various kinds. The operation of the scraper arm is controlled for example by a weighing scale. When the scraper arm has emptied a predetermined and recorded weight of aggregates of a predetermined kind into the hopper, the scraper arm is moved from one pile of aggregate to another in order to deliver a different kind of aggregate to the hopper.

According to a known technique, the endless chain of the scraper arm is allowed to operate while the latter moves laterally from one pile of aggregate to another, otherwise the resistance between the inoperative chain and the aggregate when moving the scraper arm laterally would be much too great.

When the endless chain of the scraper arm is able to move only forwardly towards the hopper, which is the case, for example, when the scraper members are constituted by buckets, the scraper arm continues to deliver aggregate into the hopper when it is moving laterally. During this period, the scraper arm thus introduces into the hopper a mixture of several aggregates, which distorts the weighing. This problem is more appreciable the further apart the piles of aggregate are spaced.

An attempt has been made to obviate this drawback by constructing scraper arms provided with chains which are movable in two directions. Thus, during the periods corresponding to the lateral movements of the scraper arm, the direction of travel of the endless chain is reversed and the scraper arm members move over the piles of aggregates without loading the hopper. However, each lateral maneuver nevertheless leads to a certain degree of mixing of the piles of aggregate and the drawback continues to exist especially when the piles of aggregate are very close to each other, in view of the fact that during the short period of rearward travel, all of the scraper arm members do not have time to jettison the aggregate which they contain.

SUMMARY OF THE INVENION

The present invention has as its object the provision of a scraper arm which effectively prevents any mixing of the aggregate or other loose products and which thus facilitates greater weighing accuracy.

According to the present invention there is provided a scraper arm including an endless chain provided at intervals with scraper arm members adapted to travel in a vertical plane along a predetermined path around a support, means for driving the endless chain and for effecting lateral movements of the scraper arm, and means for elevating the support at at least one of its ends so as to render the scraper arm members inoperative by moving them away from the ground.

Preferably the support is inclined to the horizontal with its upper end at the hopper.

Preferably, the elevating means are at the upper end of the scraper arm.

Preferably, the elevating means are at the lower end of the scraper arm, which is provided with a carriage which travels on the ground by means of wheels, the axes of which are substantially horizontal and parallel to the vertical plane of the chain.

Elevating means may be provided at the two ends of the scraper arm to raise these ends simultaneously.

According to an additional feature of the invention, the elevating means may include at least one vertically-acting jack.

Alternatively, the elevating means includes at least one cable passing over a pulley having a fixed horizontal axis with one end of the cable anchored to the support of the scraper arm and the other end wound on to the drum of a winch.

The upper end of the scraper arm may be mounted to pivot about a horizontal axis, with means being provided for raising the scraper arm by causing it to pivot about this horizontal aixs.

BRIEF DESCRIPTION OF THE DRAINWGS

Embodiments of the present invention will now be described, by way of example, with reference to the accompanying drawings, in which:

FIGS. 3 to 7 are side views of several embodiments of arms according to the invention.

DETAILED DESCRIPTION OF THE PREFERRED EMBODIMENTS

Figure 1:
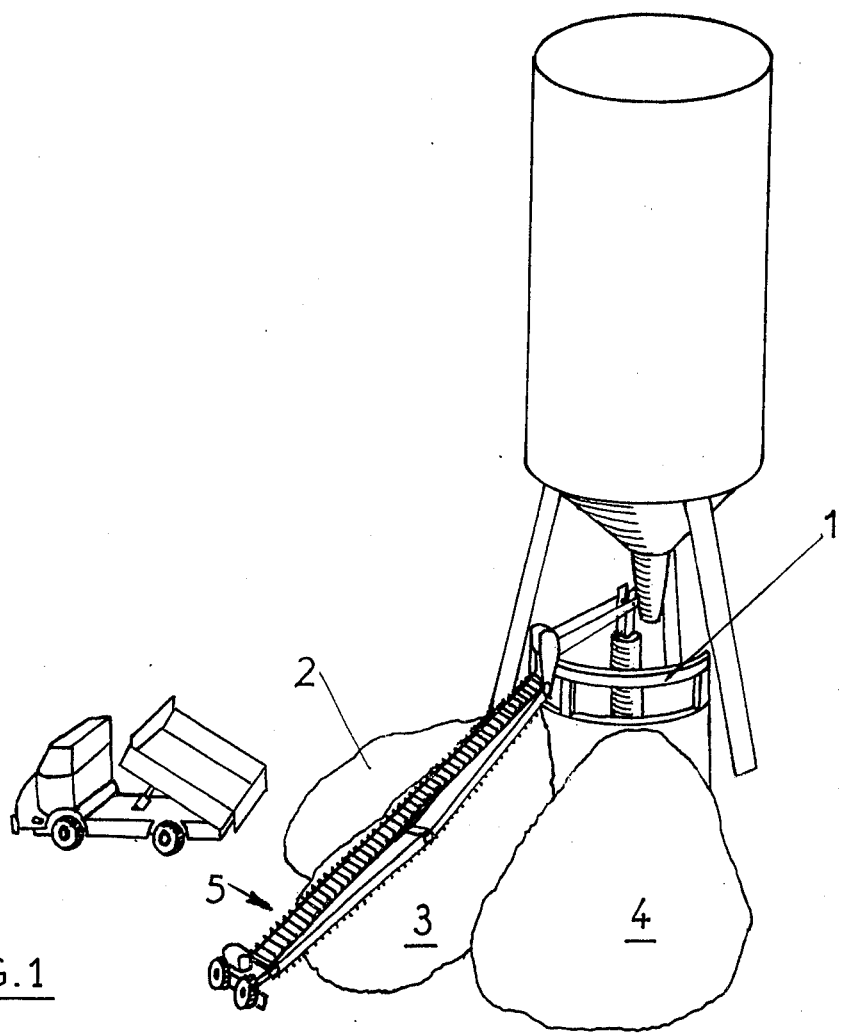
FIG. 1 is a perspective view of a concrete mixer provided with a scraper arm according to the invention.

FIG. 1 shows a concrete mixer of conventional construction which includes a central hopper 1 around which are arranged several piles of aggregate 2, 3 and 4 of different categories, i.e. of varying granular size. Each of these piles is arranged in a sector of a circle circumscribing the hopper 1. A scraper arm 5 according to the invention is provided for moving from one pile to another to deliver aggregates removed from the various piles into the hopper 1.

Figure 2:
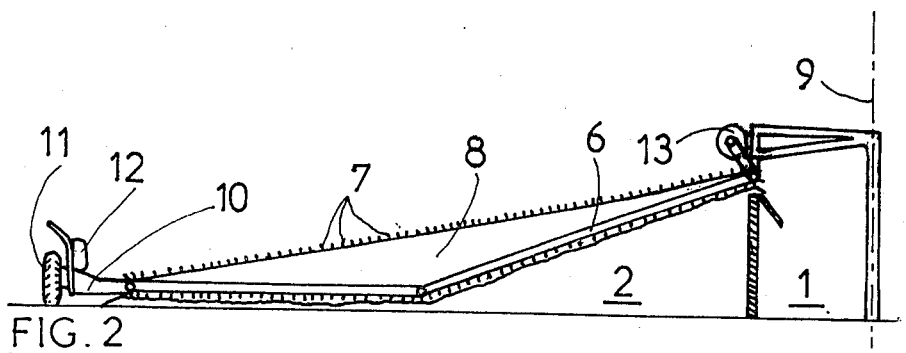
FIG. 2 illustrates a conventional scraper arm.

As can be seen in FIG. 2, which illustrates a conventional scraper arm, a scraper arm generally includes an endless chain 6 provided at intervals with scraper members 7 and traveling in a vertical plane about a support 8. At its upper end, the support 8 is mounted on the edge of the hopper 1 for pivoting about a vertical axis 9. At its free lower end, the support 8 is supported on a carriage 10. The carriage 10 is provided with wheels 11 whose axes of rotation are substantially horizontal and parallel to the vertical plane of the endless chain 6. A motor 12 is mounted on the carriage 10 to rotate the wheels 11 and thus effect lateral movements of the scraper arm. A motor 13 which drives the endless chain 6 is located on the upper part of the support 8.

FIG. 3 shows a scraper arm according to the invention. This scraper arm includes the same components as that of FIG. 2, with the following additional feature: the upper end of the support 8 is slidable vertically with respect to the fixed hopper 1 so as to move up and down under the control of a hydraulic jack 14.

The operation is as follows: when it is desired to remove aggregate from one of the piles in order to deliver same into the hopper 1, the support 8 is left in the lower position, i.e. the hydraulic jack 14 remains retracted. The scraper arm is thus in the same position as that of FIG. 2.

When it is desired to remove aggregate from another pile, the hydraulic jack 14 is extended upwardly and the support 8 and the endless chain 6 are raised. The scraper arm is illustrated in this position in FIG. 3. This causes the scraper members 7 to be spaced a distance above the pile, so that these members no longer tend to oppose the lateral movement of the scraper arm while at the same time they are provisionally inoperative as regards transportation of the aggregate.

According to FIG. 4, it is the lower end of the support 8 which is movable vertically and not its upper end. Thus, the lower end of the support 8 is mounted to be moved vertically upwardly or downwardly relative to the carriage 10 under the control of a hydraulic jack 15.

In this case also, when the hydraulic jack 15 is retracted, the position of the scraper arm is exactly the same as that which is illustrated in FIG. 2. FIG. 4 shows the scraper arm when the hydraulic jack 15 is extended upwardly, i.e. when the support 8 is in the raised position. It will be seen that the scraper members 7 are spaced a distance above the pile of aggregate.

In FIG. 5, both ends of the scraper arm are movable upwardly and downwardly vertically, under the control of the hydraulic jacks 14 and 15. The operation is as previously described.

In FIG. 6, the scraper arm has no supporting carriage 10 at its lower end, and its upper end is fixed to a horizontal shaft 16 mounted on a member 17 which pivots about the vertical axis 9. A hydraulic jack 18 is provided to swing the support 8 upwardly about the pivot 16. FIG. 6 corresponds to the extended position of the hydraulic jack 18, whereby the scraper arm is supported in an overhung position by the hopper 1, at a distance above the pile of aggregate.

In FIG. 7, the upper end of the support 8 is movable vertically with respect to the stationary hopper 1 not under the control of a hydraulic jack 14, as was the case for FIG. 3, but under the control of a winch including a drum 19 on to which a cable 20 winds. The cable 20 is directed upwardly from the drum 19 in order to pass over a pulley 21 whose fixed axis is horizontal, then re-descends to be secured by its free end to the support 8. In this case, the support 8 is raised by controlling the winding of the cable 20 on to the drum 19 of the winch.

The invention is applicable to all forms of scraper arms, scraper members, bucket-chains and apparatus provided in a general manner with scraper members connected to an endless chain.

What I claim is:

1. A scraper arm apparatus for transporting aggregate material to a container having a vertical longitudinal axis and at least a partial cylindrical wall extending vertically above the ground level from the ground adjacent to said container, said apparatus comprising:
    a first support member rotatably connected within said container, said first support member extending upwardly approximately along said longitudinal axis of said container and rotatable thereabout;
    a second elongated support member pivotally fastened to said first support member so as to be selectively pivotable about an axis perpendicular to said longitudinal axis, said second support member having one end and an opposite end, said one end of said support member being disposed above said wall of said container and further extending vertically downwardly and horizontally away from said wall of said container to the ground level, said opposite end being positioned at a lower level than said one end and adjacent to the aggregate material on the ground level;
    a predetermined path around the periphery of said second elongated support member extending from said one end, around said opposite end and back to said one end to form a continuous circuit around said second elongated support member;
    an endless chain slidably mounted to said periphery of said second elongated support member;
    a plurality of spaced apart scraper members oriented to travel along said predetermined path around said periphery of said second elongated support member;
    means for driving said endless chain around said predetermined path and for effecting the lateral movements of said plurality of spaced apart scraper members around said periphery of said second elongated support member to engage the aggregate material on the ground level and to transport the aggregate material to the top of said wall of said container;
    means for vertically elevating at least one of said one and said opposite ends of said second elongated support member from the ground level so as to render said scraper plurality of spaced apart members incapable of engaging the aggregate material on the ground level, said elevating means comprising:
    at least one winch rotatably interconnected with said first support member;
    a drum for said winch having a cable winding surface therearound;
    a pulley mounted to said first support member at a location above said wall; and
    a cable having a first end and a second end, said first end of said cable being wound around said cable winding surface of said drum and said second end of said cable being directed upwardly from said drum to pass over said pulley and being attached to said one end of said second elongated support member such that, upon selective operation of said winch, said cable lowers and raises said one end of said second elongated support member.

2. The scraper arm apparatus of claim 1 further comprising a carriage interconnected with said other end of said second elongated support member and having at least one wheel, said at least one wheel having an axis which is positioned substantially horizontal to the ground level such that said at least one wheel rolls along the ground when said first support member is rotated relative to said container.

3. A scraper arm apparatus for transporting aggregate material to a container having a vertical longitudinal axis and at least a partial cylindrical wall extending vertically above the ground level from the ground adjacent to said container, said apparatus comprising:
    a first support member rotatably connected within said container, said first support member extending upwardly approximately along said longitudinal axis of said container and rotatable thereabout;
    a second elongated support member pivotally fastened to said first support member so as to be selectively pivotable about an axis perpendicular to said longitudinal axis, said second elongated support member having one end and an opposite end, said one end of said second elongated support member being disposed above said container interior to said wall of said container and further extending vertically downwardly and horizontally away from said wall of said container to the ground level, said opposite end being positioned at a lower level than said one end and adjacent to the aggregate material on the ground level;

a predetermined path around the periphery of said elongated second support member extending from said one end, around said opposite end and back to said one end to form a continuous circuit around said second elongated support member;

an endless chain slidably mounted to said periphery of said second elongated support member;

a plurality of spaced apart scraper members oriented to travel along said predetermined path around said periphery of said second elongated support member;

means for driving said endless chain around said predetermined path and for effecting the lateral movements of said plurality of spaced apart scraper members around said periphery of said second elongated support member to engage the aggregate material on the ground level and to transport the aggregate material to the top of said wall of said container;

a carriage interconnected with said opposite end of said second elongated support member and having at least one wheel, said at least one wheel having an axis which is positioned substantially horizontal to the ground level such that said at least one wheel rolls along the ground when said first support member is rotated relative to said container; and means for vertically elevating said opposite end of said second elongated support member from the ground level, interposed said opposite end and said carriage so as to render said plurality of spaced apart scraper members selectively incapable of engaging the aggregate material on the ground level.

4. The scraper arm apparatus of claim 3 further comprising means for vertically elevating said one end of said second elongated support member independently of said means for vertically elevating said opposite end of said second elongated support member.

5. The scraper arm apparatus of claim 3 further comprising second elevating means for elevating said first support member.

6. The scraper arm apparatus of claims 4, 5 or 3 wherein said elevating means further comprises at least one hydraulic jack means.

* * * * *

UNITED STATES PATENT AND TRADEMARK OFFICE
CERTIFICATE OF CORRECTION

PATENT NO. : 4,417,652

DATED : November 29, 1983

INVENTOR(S) : Gaston Grandmenil

It is certified that error appears in the above-identified patent and that said Letters Patent is hereby corrected as shown below:

Column 2, line 25, delete "DRAINWGS" and insert ---- DRAWINGS ----.

Column 4, line 29, delete "scraper plurality of spaced apart" and insert ---- plurality of spaced apart scraper ----.

Column 5, line 12, delete "elongated second" and insert ----- second elongated ----.

Signed and Sealed this

Twenty-ninth Day of January 1985

[SEAL]

Attest:

DONALD J. QUIGG

Attesting Officer

Acting Commissioner of Patents and Trademarks